(12) United States Patent
Kim et al.

(10) Patent No.: US 9,373,307 B2
(45) Date of Patent: *Jun. 21, 2016

(54) APPARATUS AND METHOD FOR REDUCING CURRENT CONSUMPTION IN PORTABLE TERMINAL WITH FLEXIBLE DISPLAY

(71) Applicant: Samsung Electronics Co. Ltd., Suwon-si, Gyeonggi-do (KR)

(72) Inventors: Min-Soo Kim, Gum-si (KR); Seung-Hyun Park, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 185 days.

This patent is subject to a terminal disclaimer.

(21) Appl. No.: 13/775,876

(22) Filed: Feb. 25, 2013

(65) Prior Publication Data

US 2013/0162526 A1 Jun. 27, 2013

Related U.S. Application Data

(63) Continuation of application No. 12/900,833, filed on Oct. 8, 2010, now Pat. No. 8,385,987.

(30) Foreign Application Priority Data

Oct. 14, 2009 (KR) .................. 10-2009-0097756

(51) Int. Cl.
*G09G 5/14* (2006.01)
*G06F 3/01* (2006.01)
(Continued)

(52) U.S. Cl.
CPC .......... *G09G 5/14* (2013.01); *G06F 1/163* (2013.01); *G06F 1/1626* (2013.01);
(Continued)

(58) Field of Classification Search
CPC .............. H04M 2250/16; H04M 2250/20; H04M 2250/22; H04M 2250/52; H04M 1/0266; H04M 1/0268; G06F 1/163; G06F 1/1626; G06F 1/1652; G06F 1/1694; G06F 1/3231; G06F 1/3265; G06F 3/01; G09G 5/14; G09G 2330/021; Y02B 60/1242; Y02B 60/1289
USPC .............. 455/550.1, 556.1, 556.2, 566, 90.1, 455/90.2, 90.3, 575.1, 575.2, 575.3, 575.4, 455/575.5, 575.6; 345/1.3, 3.1, 44, 45, 46, 345/48, 50, 51, 82, 83, 87, 88, 173, 207, 345/214, 589, 619
See application file for complete search history.

(56) References Cited

U.S. PATENT DOCUMENTS

| | | | |
|---|---|---|---|
| 6,311,076 B1 | 10/2001 | Peuhu et al. | |
| 7,505,085 B2 | 3/2009 | Park | |
| 8,831,687 B1 * | 9/2014 | Kotab | ...................... 455/566 |
| 2002/0114519 A1 | 8/2002 | Mastrianni et al. | |
| 2003/0080967 A1 | 5/2003 | Milch et al. | |

(Continued)

FOREIGN PATENT DOCUMENTS

| | | |
|---|---|---|
| JP | 10-257143 A | 9/1998 |
| JP | 2005-221907 A | 8/2005 |
| KR | 10-2006-0057183 A | 5/2006 |

*Primary Examiner* — Vladimir Magloire
*Assistant Examiner* — Erica Navar
(74) *Attorney, Agent, or Firm* — Jefferson IP Law, LLP

(57) ABSTRACT

A portable device with a flexible display and a method for displaying information in the portable device with a flexible display are provided. The portable device includes a sensor for detecting at least one of a user's face and an ambient brightness, the flexible display including a first area and a second area, and a controller for displaying information in the first area when at least one of the user's face is detected and the ambient brightness has a value greater than a threshold, and for displaying the information in the second area when at least one of the user's face is not detected and the ambient brightness has value less than the threshold.

9 Claims, 5 Drawing Sheets

(51) Int. Cl.
*G06F 1/16* (2006.01)
*G06F 1/32* (2006.01)

(52) U.S. Cl.
CPC ........... *G06F 1/1652* (2013.01); *G06F 1/1694* (2013.01); *G06F 1/3231* (2013.01); *G06F 1/3265* (2013.01); *G06F 3/01* (2013.01); *G09G 2330/021* (2013.01); *Y02B 60/1242* (2013.01); *Y02B 60/1289* (2013.01)

(56) References Cited

U.S. PATENT DOCUMENTS

| 2006/0109221 | A1 | 5/2006 | Park | |
| 2010/0029327 | A1* | 2/2010 | Jee | G04G 17/045 455/556.1 |
| 2010/0056223 | A1* | 3/2010 | Choi et al. | 455/566 |
| 2010/0120470 | A1* | 5/2010 | Kim et al. | 455/566 |

* cited by examiner

APPARATUS AND METHOD FOR REDUCING CURRENT CONSUMPTION IN PORTABLE TERMINAL WITH FLEXIBLE DISPLAY

PRIORITY

This application is a continuation of prior application Ser. No. 12/900,833, filed on Oct. 8, 2010, which claimed the benefit under 35 U.S.C. §119(a) of a Korean patent application filed on Oct. 14, 2009 in the Korean Intellectual Property Office and assigned Serial No. 10-2009-0097756, the entire disclosure of which is hereby incorporated by reference.

BACKGROUND OF THE INVENTION

1. Field of the Invention

The present invention relates to an apparatus and method for reducing current consumption in a portable terminal including a flexible display. More particularly, the present invention relates to an apparatus and method for reducing current consumption when a portable terminal including a flexible display is bent.

2. Description of the Related Art

Portable terminals, such as a mobile communication terminal, a Personal Digital Assistant (PDA), a Portable Multimedia Player (PMP), and the like, are becoming increasingly smaller in size for portability.

However, since users reproduce and transmit information, such as texts, moving pictures, still images, music files, games, and the like, using a screen of a portable terminal, a large size display screen has become desirable.

As the portable terminal becomes smaller, the display screen also becomes smaller, which limits the usefulness of the display screen to the user when receiving, reproducing and transmitting information.

Recently, to overcome the limitation of small display screens, a flexible display of the portable terminal has been introduced. The flexible display, which is a future generation of displays, is formed in a thin substrate such as plastic and cannot be damaged even when the display is folded or rolled.

However, since the flexible display of the portable terminal can be bent, there is an area of the display that is out of a viewing angle range of a user when the portable terminal is bent.

Accordingly, if display content is displayed on the area which is out of the viewing angle range or if the flexible display is used as a full screen, power of the portable terminal is wasted.

Therefore, a need exists for an apparatus and method for reducing power of the portable terminal when the flexible display is in a full screen state and in a bent state.

SUMMARY OF THE INVENTION

An aspect of the present invention is to address at least the above-mentioned problems and/or disadvantages and to provide at least the advantages described below. Accordingly, an aspect of the present invention is to provide an apparatus and method for reducing current consumption in a portable terminal including a flexible display when the portable terminal is bent.

In accordance with an aspect of the present invention, a portable device with a flexible display is provided. The portable device includes a sensor for detecting at least one of a user's face and an ambient brightness, the flexible display including a first area and a second area, and a controller for displaying information in the first area when at least one of the user's face is detected and the ambient brightness has a value greater than a threshold, and for displaying the information in the second area when at least one of the user's face is not detected and the ambient brightness has value less than the threshold.

In accordance with another aspect of the present invention, a method for displaying information in a portable device with a flexible display is provided. The method includes determining whether at least one of a user's face is detected and an ambient brightness has a value higher than a threshold, displaying information in a first area of the flexible display when at least one of the user's face is detected and the ambient brightness has a value greater than the threshold, and displaying the information in a second area of the flexible display if at least one of the user's face is not detected and the ambient brightness has value less than the threshold.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the spirit and scope of the invention. In addition, descriptions of well-known functions and constructions may be omitted for clarity and conciseness The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention provide a flexible display of a portable terminal that includes a first region in which a camera is mounted and a second region in which the camera is not mounted. The first region is located opposite to the second region when the flexible display is bent.

Figure 1A:
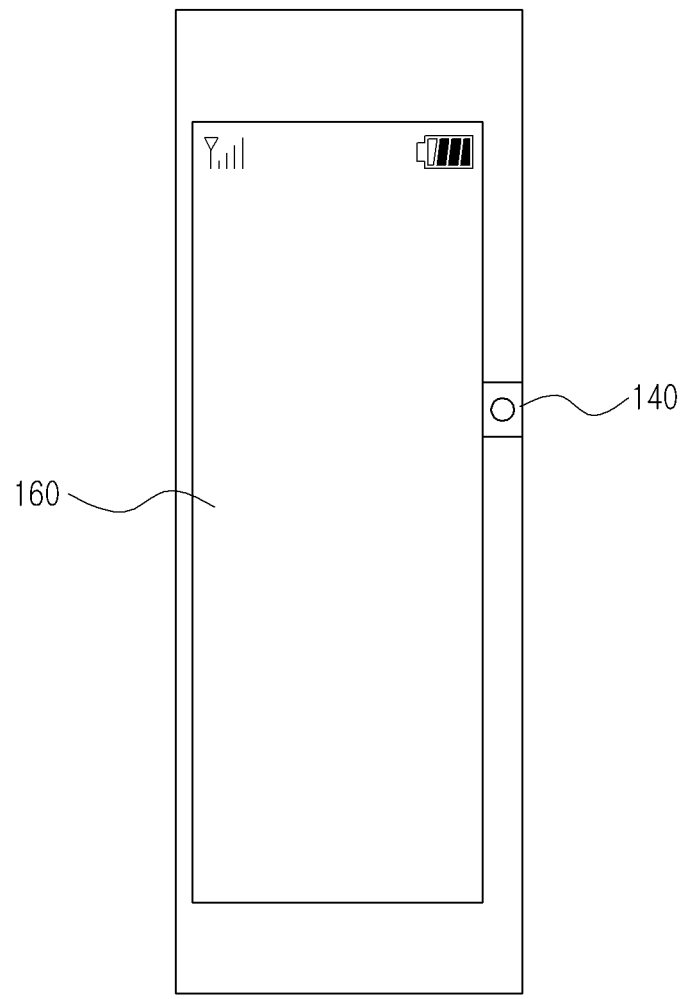
FIGS. 1A and 1B are diagrams illustrating a portable terminal including a camera and a flexible display according to an exemplary embodiment of the present invention.
Figure 1B:
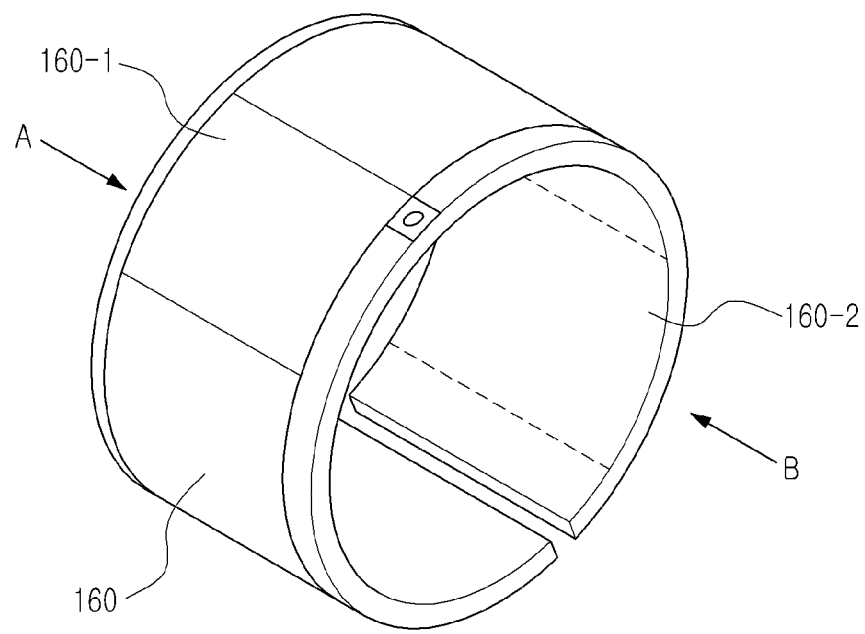

FIGS. 1A and 1B are diagrams illustrating a portable terminal including a camera and a flexible display according to an exemplary embodiment of the present invention.

Referring to FIG. 1A, the portable terminal includes a flexible display 160 and a camera 140.

When the portable terminal is bent as illustrated in FIG. 1B, the flexible display 160 includes a first region A in which the camera 140 is mounted and a second region B in which the camera 140 is not mounted.

The first region A of the flexible display 160 includes a first display area 160-1 and the second region B of the flexible display 160 includes a second display area 160-2.

Figure 2:
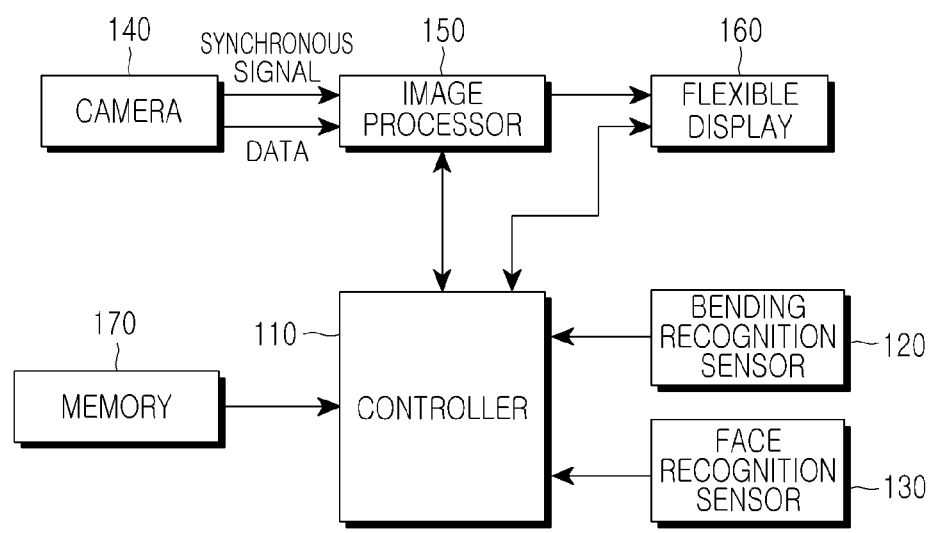
FIG. 2 is a block diagram illustrating a configuration of a portable terminal according to an exemplary embodiment of the present invention.

FIG. 2 is a block diagram illustrating a configuration of the portable terminal according to an exemplary embodiment of the present invention.

Referring to FIG. 2, the camera 140 photographs an image, and includes a camera sensor for converting an optical signal of the photographed image into an electric signal and a signal processor for converting an analog image signal photographed by the camera sensor into digital data. The camera sensor may be a Charge Coupled Device (CCD) and the signal processor may be a Digital Signal Processor (DSP). The camera sensor and the signal processor may be integrally formed as one device or may be formed as independent devices.

In an exemplary implementation, the camera 140 is mounted in the first region A and is driven to take a picture of an image when the portable terminal is bent as illustrated in FIG. 1B.

An image processor 150 generates screen data to display an image signal generated from the camera 140. The image processor 150 processes the image signal generated from the camera 140 in units of frames and generates frame image data according to characteristic and size of the flexible display 160. The image processor 150 includes an image codec, for example, a Joint Photographic Experts Group (JPEG) codec, a Moving Picture Experts Group (MPEG) codec, a wavelet codec and the like. The image processor 150 compresses the frame image data displayed on the flexible display 160 according to a preset method or restores the compressed image data to original frame image data. It is assumed herein that the image processor 150 includes an On Screen Display (OSD) function. The image processor 150 generates OSD data according to a screen size displayed under the control of a controller 110.

The flexible display 160 is formed in a thin substrate such as plastic and uses a display element such as electronic paper, a Liquid Crystal Device (LCD), an Organic Light Emitting Diode (OLED), and the like. The flexible display 160 displays user data generated by the controller 110.

When the portable terminal is bent as illustrated in FIG. 1B, an area of the flexible display 160 may be divided into the first area 160-1, the second area 160-2, and other areas.

When the portable terminal is bent, the flexible display 160 displays display information data (i.e., information data) on the first area 160-1 or the second area 160-2 according to whether a face image of a user is photographed through the camera 140.

A memory 170 includes a program memory and a data memory. The program memory stores programs for controlling a general operation of the portable terminal. The data memory temporarily stores data generated while the programs are executed.

In an exemplary implementation, the memory 170 stores a first area value and a second area value to distinguish between the first area 160-1 and the second area 160-2 of the flexible display 160 when the portable display 160 is bent as illustrated in FIG. 1B.

In an exemplary implementation, the memory 170 stores a reference value for determining brightness of a photographed image when the image photographed through the camera 140 is not a face image under a state when the portable terminal is bent.

A bending recognition sensor 120 detects that the flexible display 160 of the portable terminal is bent when the flexible display 160 is changed from a state illustrated in FIG. 1A to the state illustrated in FIG. 1B, and transmits a detected signal to the controller 110.

A face recognition sensor 130 detects the face image of a user photographed through the camera 140 when the flexible display 160 of the portable terminal is changed from the state illustrated in FIG. 1A to the state illustrated in FIG. 1B, and transmits a detected signal to the controller 110.

The controller 110 controls the overall operation of the portable terminal and may include a modem and a codec.

In an exemplary implementation, if it is determined that the image photographed through the camera 140 is a face image when the flexible display 160 of the portable is changed from the state illustrated in FIG. 1A to the state illustrated in FIG. 1B, the controller 110 controls the flexible display 160 to display information data on the first area 160-1 and null data on the second area 160-2.

In an exemplary implementation, if it is determined that the image photographed through the camera 140 is not a face image or the brightness of the photographed image is less than a preset reference value, when the flexible display 160 of the portable terminal is changed from the state illustrated in FIG. 1A to the state illustrated in FIG. 1B, the controller 110 controls the flexible display 160 to display null data on the first area 160-1 and information data on the second area 160-2. The null data comprise black data (i.e., a black screen). A process for reducing the current consumption in the portable terminal including the flexible display will be described below with reference to FIG. 3.

Figure 3:
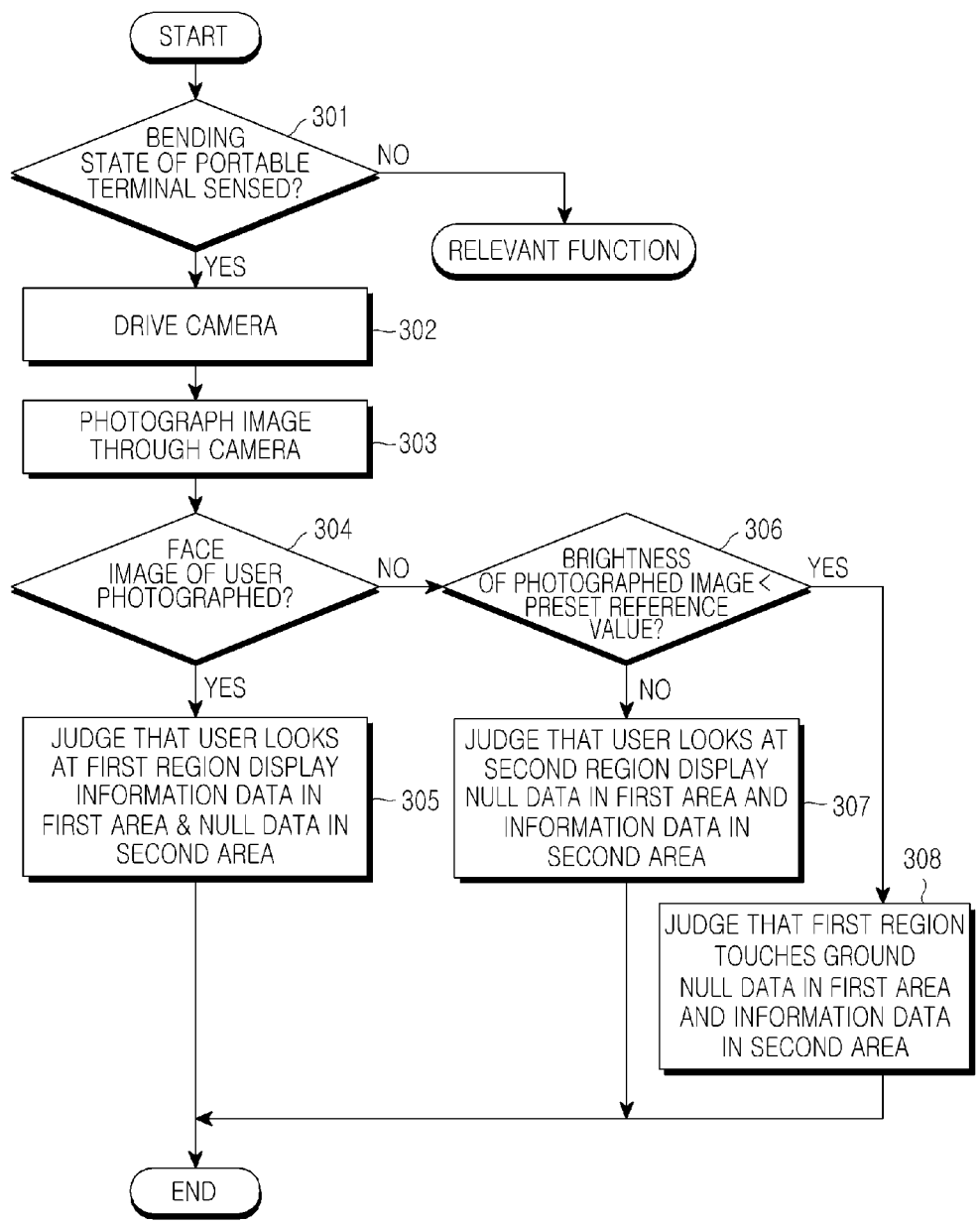
FIG. 3 is a flowchart illustrating a process for reducing current consumption in a portable terminal including a flexible display according to an exemplary embodiment of the present invention.

FIG. 3 is a flowchart illustrating a process for reducing current consumption in a portable terminal including a flexible display according to an exemplary embodiment of the present invention. In an exemplary implementation, one camera 140 is used by way of example. However, it should be understood that the portable terminal may be implemented with a plurality of cameras to more accurately measure a location of a user by photographing a face image of the user.

By bending the portable terminal as illustrated in FIG. 1B, the portable terminal may be rolled on a user's arm. If the portable terminal is rolled on the arm of the user, the portable terminal may be changed from the state illustrated in FIG. 1A to the state illustrated in FIG. 1B, the bending recognition sensor 120 then detects a bent state of the portable terminal in step 301 and provides a detected signal to the controller 110. The controller 110 receives the detected signal and drives the camera 140 in step 302.

The controller 110 controls the camera 140 to photograph an image in step 303. The face recognition sensor 130 determines whether the image is a face image and provides a detecting signal to the controller 110 in step 304.

If it is determined in step 304 that the photographed image is a face image, i.e., a user looked at the first region A in which the camera is mounted, through the detecting signal received from the face recognition sensor 130, the controller controls the flexible display 160 to display information data on the first area 160-1 of the flexible display 160 located in the first region A and to display null data on the second area 160-2 of the flexible display 160 located in the second region B opposite the first region A, in step 305.

The controller 110 may control the flexible display 160 to display null data on other areas except for the first area 160-1 and the second area 160-2.

In step 304, if it is determined that the image photographed through the camera 140 is not a face image, the controller 110 determines whether the brightness of the photographed image is less than a preset reference value in step 306.

In step 306, if it is determined that the brightness of the photographed image is not less than the preset reference value, the controller 110 controls the flexible display 160 to display null data on the first area 160-1 of the flexible display 160 located in the first region A and to display information data on the second area 160-2 of the flexible display located in the second region B opposite the first region A in step 307.

That is, if the image photographed through the camera 140 is not a user face image and the brightness of the photographed image is not less than the preset reference value, the user looked at the second region B of the flexible display 160 which is opposite to the first region A in which the camera 140 is mounted.

The controller 110 may control the flexible display 160 to display null data on the other areas except for the first area 160-1 and the second area 160-2.

If the brightness of the photographed image is less than the preset reference value in step 306, the controller 110 controls the flexible display 160 to display null data on the first area 160-1 of the flexible display 160 located in the first region A and to display information data on the second area 160-2 of the flexible display located in the second region B opposite the first region A in step 308.

That is, if the image photographed through the camera 140 is not a user face image and the brightness of the photographed image is less than the preset reference value, the first region A in which the camera 140 is mounted of the flexible display 160 direction is toward the ground.

The controller 110 may control the flexible display 160 to display null data on the other areas except for the first area 160-1 and the second area 160-2.

In an exemplary implementation, the null data indicates black data. Accordingly, the first area 160-1 or the second area 160-2 of the flexible display, which is out of a viewing angle range of a user when the portable terminal is bent, is displayed by black data, thereby reducing the current consumption.

If an OLED displays the black data, the OLED consumes little current. The black data consumes less than 10% of the current consumed by white data (i.e., a white screen).

Figure 4:
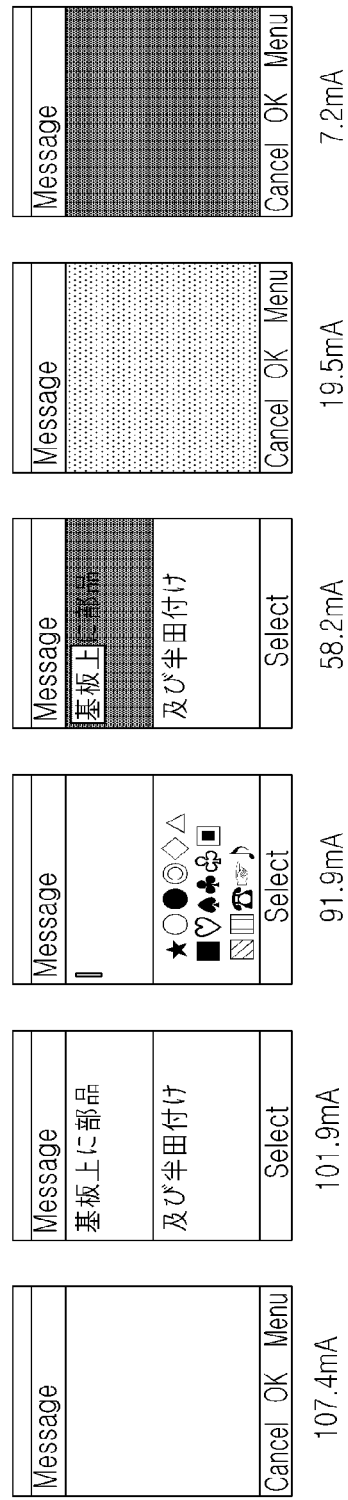
FIG. 4 is a diagram illustrating a reduction in current consumption when a flexible display of a portable terminal displays black data according to an exemplary embodiment of the present invention.

FIG. 4 is a diagram illustrating a reduction in current consumption when a flexible display of a portable terminal displays black data according to an exemplary embodiment of the present invention.

Referring to FIG. 4, the flexible display illustrates current consumption examples of the portable terminal when white data is displayed, black data is displayed, information data is displayed in a first region and a second region, information data is displayed in a first region, information data is displayed a second region, and the like.

Exemplary embodiments of the present invention provide an apparatus and method which can reduce current consumption in a portable terminal including a flexible display when the portable terminal is bent. Therefore, battery use time of the portable terminal is increased and the amount of heat generated from the battery can be reduced based on the current consumption reduction of the battery.

In addition, the portable terminal provides user convenience since a display area of the flexible display is automatically controlled based on the location of a user.

While the invention has been shown and described with reference to certain exemplary embodiments thereof, it will be understood by those skilled in the art that various changes in form and details may be made therein without departing from the spirit and scope of the invention as defined by the claims and their equivalents.

What is claimed is:

1. A portable device with a flexible display, the portable device comprising:
a sensor configured to detect at least one of a user's face and a value of an ambient brightness;
the flexible display including a first area and a second area, the first area and the second area being on a same side of the flexible display; and
a controller configured to:
determine the first area and the second area of the flexible display when the flexible display is in a bent state;
display information in the first area when at least one of the user's face is detected and the value of the detected ambient brightness is greater than a threshold, and
display the information in the second area when at least one of the user's face is not detected and the value of the detected ambient brightness is less than the threshold.

2. The portable device of claim 1, further comprising a bending recognition sensor for detecting the bent state of the flexible display.

3. The portable device of claim 1, wherein the controller displays the information in one of the first area and the second area when the flexible display is bent.

4. The portable device of claim 1,
wherein the controller displays black data in the second area if the information is displayed in the first area, and
wherein the controller displays black data in the first area if the information is displayed in the second area.

5. A method for displaying information in a portable device with a flexible display, the method comprising:
determining a first area and a second area of the flexible display when the flexible display is in a bent state;
detecting whether at least one of a user's face is present and a value of ambient brightness is higher than a threshold;
displaying information in the first area of the flexible display if at least one of the user's face is present and the value of the detected ambient brightness is greater than the threshold; and
displaying the information in the second area of the flexible display if at least one of the user's face is not present and the value of the detected ambient brightness is less than the threshold,
wherein both the first area and the second area are on a same side of the flexible display.

6. The method of claim 5, wherein the user's face or the ambient brightness is detected by a sensor included in the portable device.

7. The method of claim 5, wherein a bending recognition sensor included in the portable device detects whether the portable device with the flexible display is bent.

8. The method of claim 5, further comprising displaying the information in one of the first area and the second area when the portable device with the flexible display is bent.

9. The method of claim 5, further comprising:
   displaying black data in the second area if at least one of the user's face is present and the value of the ambient brightness is greater than a threshold; and
   displaying black data in the first area if at least one of the user's face is not present and the value of the ambient brightness is less than the threshold.

\* \* \* \* \*